W. J. KILPATRICK.
ADDING AND LISTING MACHINE.
APPLICATION FILED MAY 29, 1909.
1,016,276.
Patented Feb. 6, 1912.
9 SHEETS—SHEET 3.
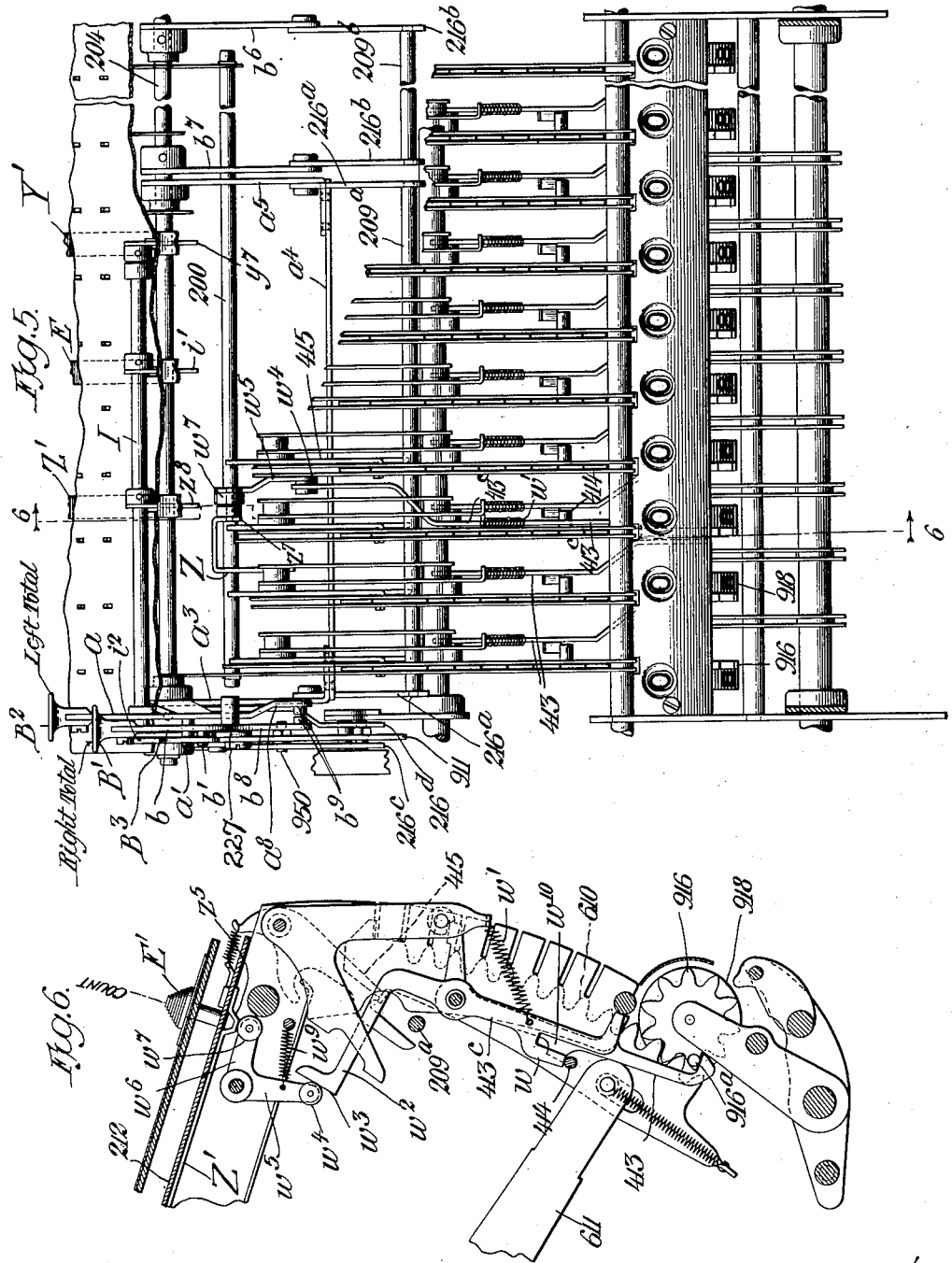

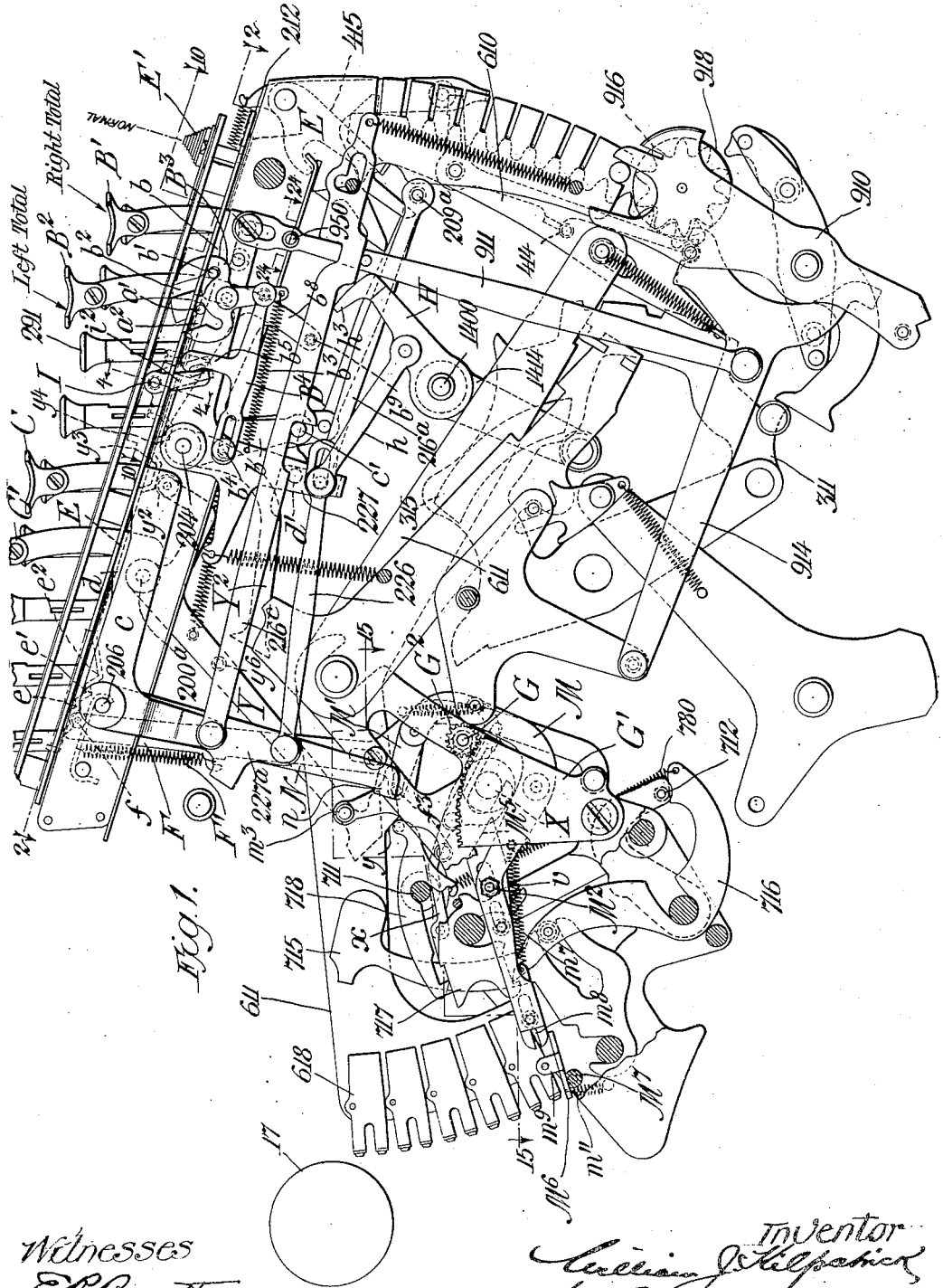

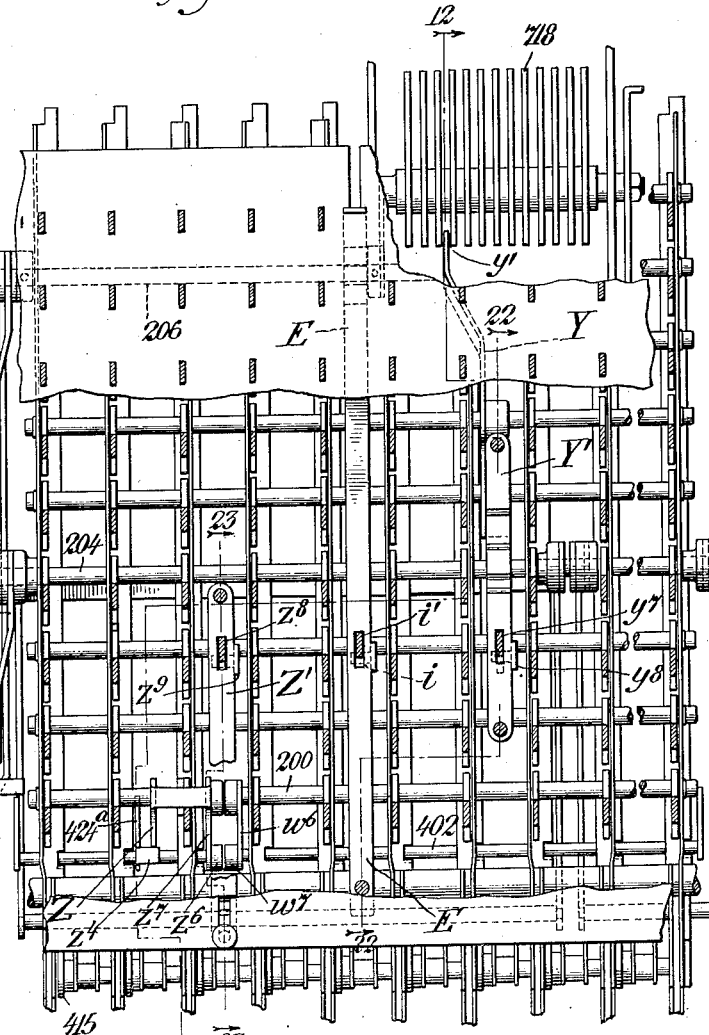

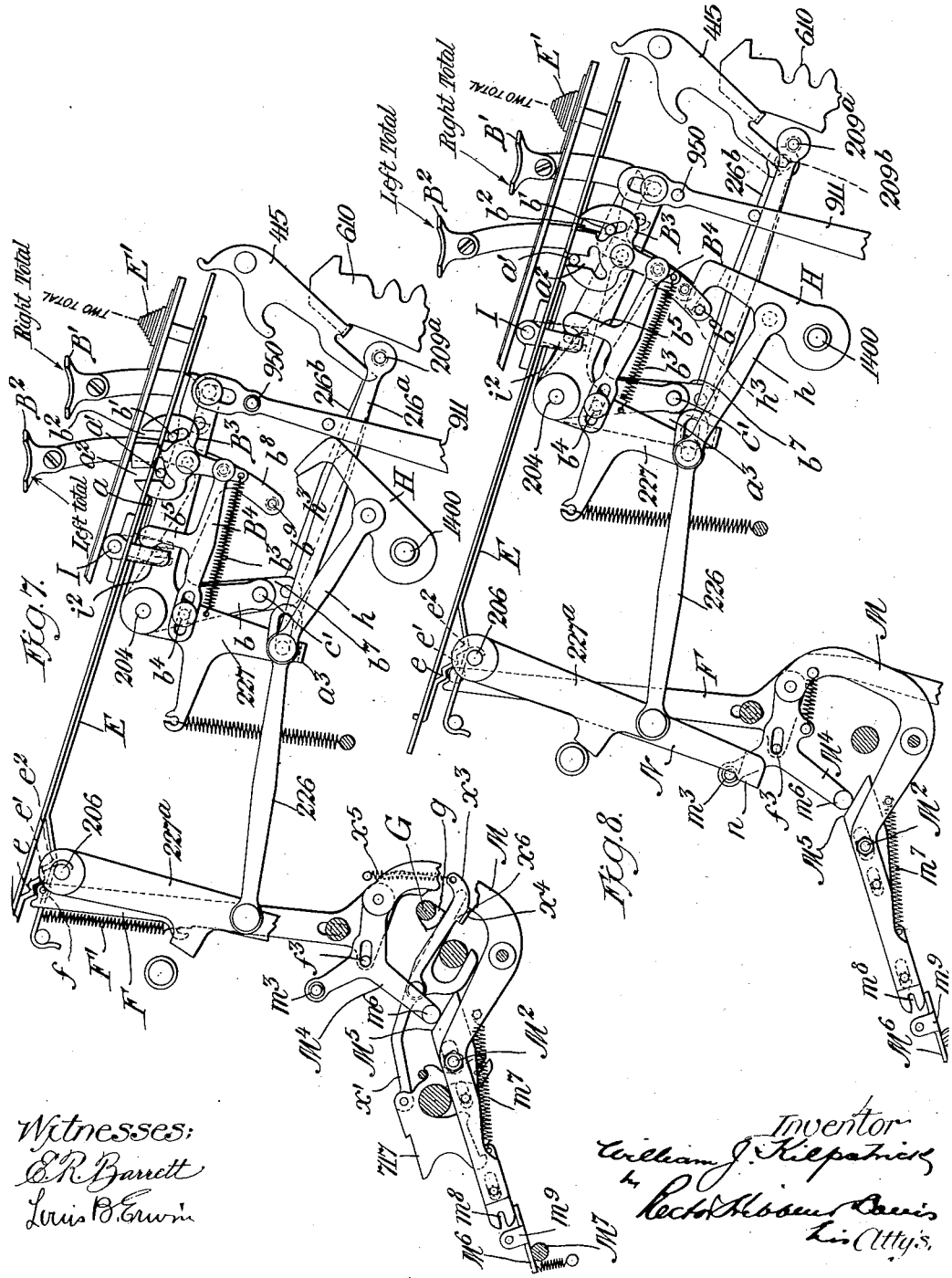

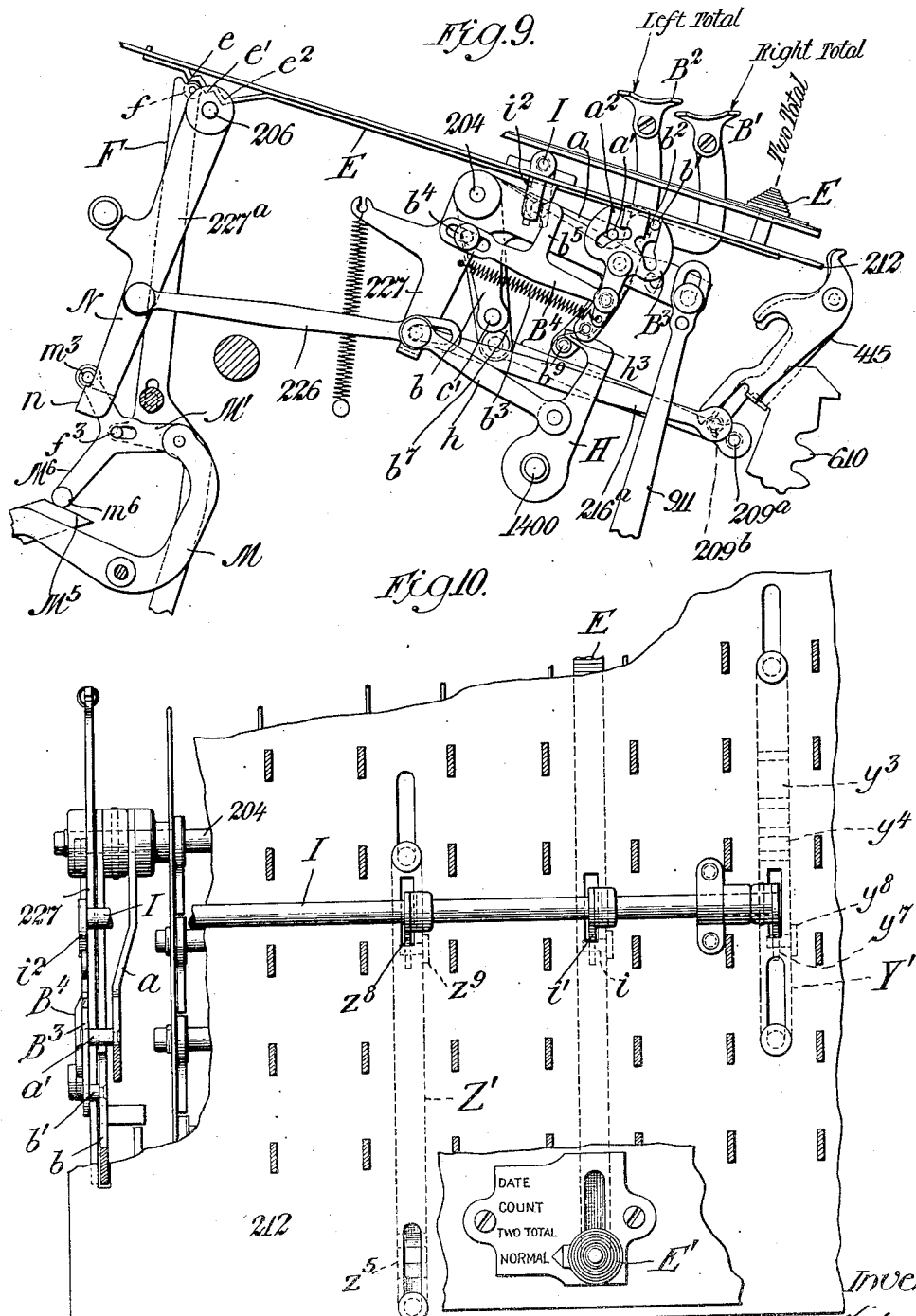

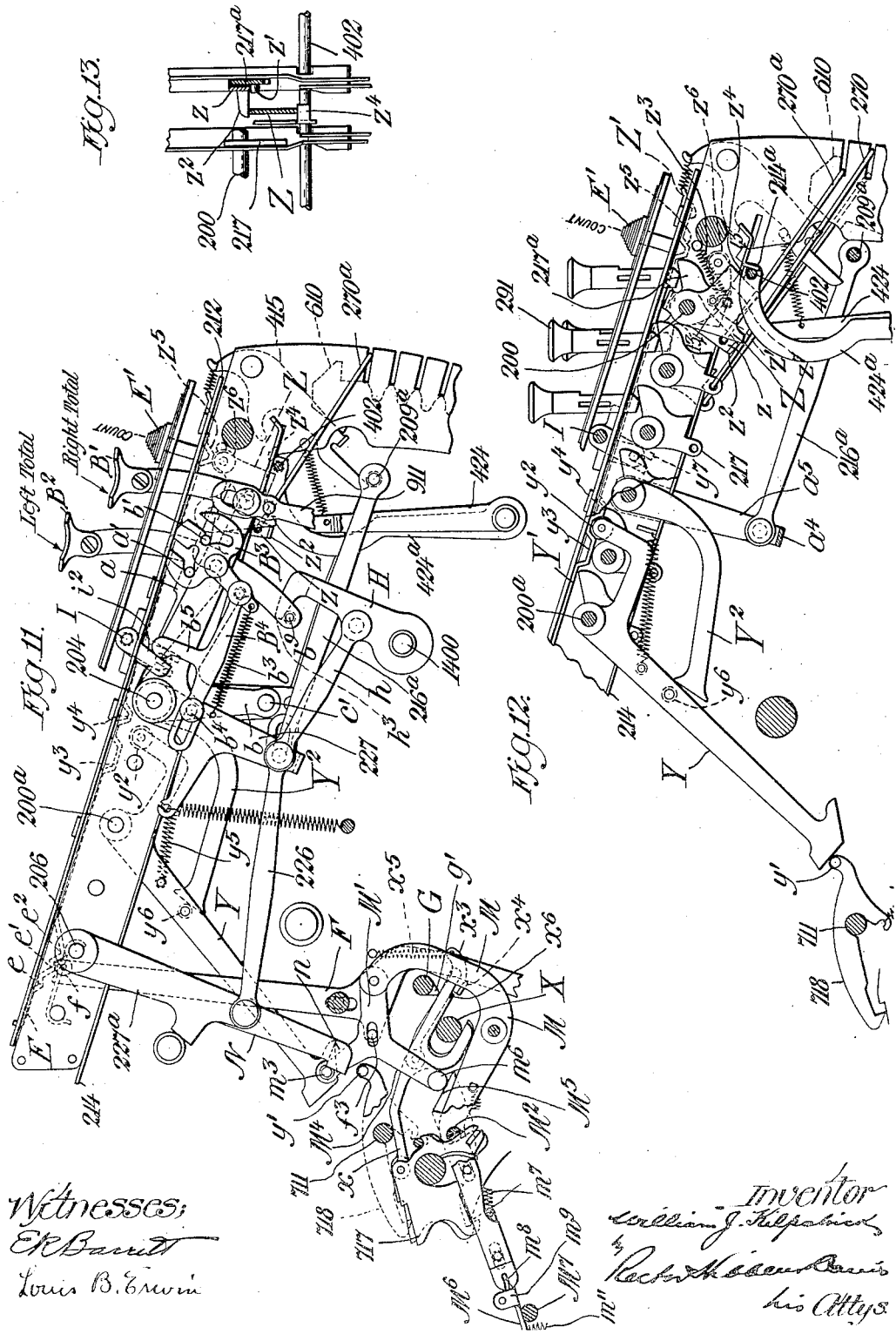

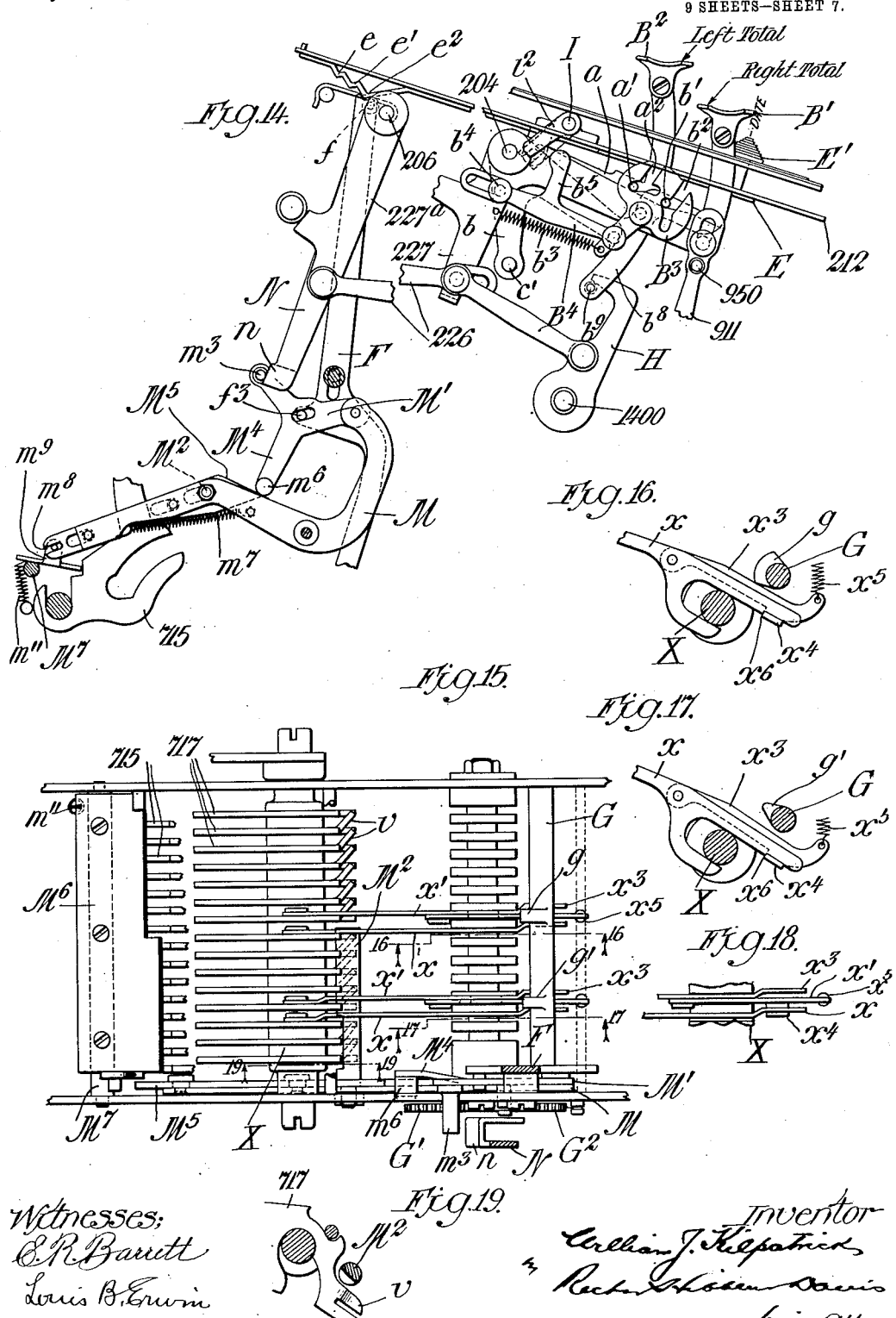

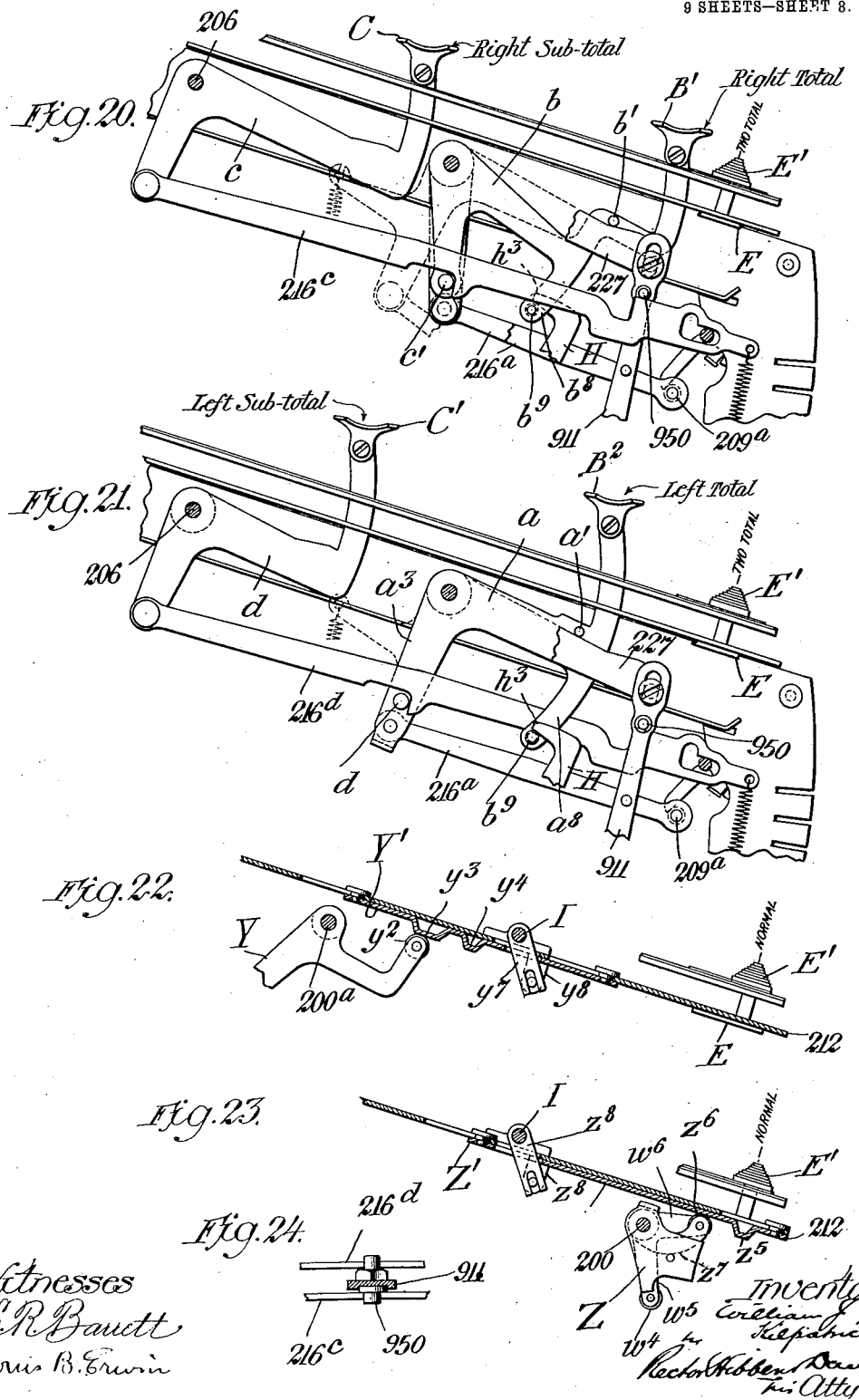

UNITED STATES PATENT OFFICE.

WILLIAM J. KILPATRICK, OF DETROIT, MICHIGAN, ASSIGNOR TO BURROUGHS ADDING MACHINE COMPANY, OF DETROIT, MICHIGAN, A CORPORATION OF MICHIGAN.

ADDING AND LISTING MACHINE.

1,016,276.  Specification of Letters Patent.  Patented Feb. 6, 1912.

Application filed May 29, 1909. Serial No. 499,210.

*To all whom it may concern:*

Be it known that I, WILLIAM J. KILPATRICK, a citizen of the United States, residing at Detroit, in the county of Wayne and State of Michigan, have invented certain new and useful Improvements in Adding and Listing Machines, of which the following is a specification.

In Patent No. 825,205, issued July 3, 1906, on the invention of Claiborne W. Gooch, is disclosed an adding and listing machine of the well-known Burroughs type, having what is known as a "split and normal" equipment, that is to say an arrangement whereby two or more lists or columns of items can be simultaneously printed or a single column whose individual items may run to the full decimal capacity of the machine, and furthermore in this Gooch construction there is provision for eliminating at will a total imprint below one of two or more lists or columns when under the so-called "split" adjustment the machine is put through a totaling operation. In Patent No. 897,941, issued September 8, 1908, on the invention of Jesse G. Vincent, an adding and listing machine of the Burroughs type is disclosed in which two total keys are employed and an arrangement whereby these keys affect different sections or subdivisions of the accumulating mechanism, the printing devices being permanently subdivided to correspond so that separate totals can be extracted from the different sections of the accumulating mechanism and printed independently of each other as footings of different lists or columns which may be simultaneously produced. In Letters Patent of Great Britain No. 656, of 1908, an adding and listing machine of the Burroughs type is disclosed wherein certain of the usual adding wheels constitute an item counter and the printing devices coöperating therewith are rendered ineffective during the operations of such certain wheels to count up the number of times the machine is operated to accumulate items upon the balance of the wheels though such printing devices do come into play to print the total count when the machine is operated to print a total of the accumulation of items on such other wheels. In the construction shown in this British patent, as in the construction shown in said Vincent United States patent there is permanent subdivision of printing devices between such as produce the imprint of the total count and such as produce the imprint of the accumulation of amounts.

The present invention relates to an adding and listing machine which combines the above-mentioned features of said prior patents, being so equipped that it can be (1) employed as an ordinary adding and listing machine to accumulate and print items or amounts to the full capacity of the keyboard or (2) employed to simultaneously accumulate different sets of amounts and print the same in different columns and separately or simultaneously print two different totals or (3) employed to print separate columns and count the accumulating operations on one or more of the regular series of wheels and print a total of the amounts printed in one column while eliminating a total of the other column and printing the count total or (4) employed to simultaneously print two columns and then the total of one eliminating the total of the other without bringing the counting means into play but utilizing the printing devices which would otherwise produce the count total, to give full decimal capacity for the printing of the un-totaled column.

In addition to the above capabilities of a machine embodying the present invention as representing an advance in the art, provision is also made for taking separate sub-totals simultaneously or not from different sections of the accumulating mechanism by manipulation of keys or the like additional to those manipulated in the taking of grand totals, so that no manipulation of keys is necessary after an operation of the machine has started, in order to take sub-totals. In this connection reference may be had to Patent No. 913,860, issued March 2, 1909, on the invention of Jesse G. Vincent, which shows a single sub-totaling key additional to the grand totaling key and operating similarly to the two sub-totaling keys of the present invention. In connection with the employment of a double total key system, another feature may be mentioned, that of locking in the operated key and at the same time locking out the un-operated key to avoid error.

Of the drawings which accompany and form part of this specification Figure 1 represents sufficient of an adding and listing machine to embrace all of the features above mentioned, this being mainly a left-side elevation though some supporting parts appear in section and some broken away; Fig. 2 is a horizontal section taken substantially on the line 2—2 of Fig. 1; Fig. 3 shows a fragment of the keyboard in top plan view; Fig. 4 is a detail cross-section taken on the line 4—4 of Fig. 1; Fig. 5 is a front elevation with parts broken away to more fully disclose others to the rear; Fig. 6 is a vertical section of the front portion of the machine taken on the line 6—6 of Fig. 5 and illustrates an effect of bringing into play the counting means; Fig. 7 is partly a left-side elevation and partly a vertical section of a considerable portion of the machine adjusted for the taking of two totals; Fig. 8 is a similar view showing one total key depressed, to-wit, that which controls the right-hand section of the accumulating mechanism; Fig. 9 is a similar view showing the other total key depressed, to-wit that one which controls the left-hand section of the accumulating mechanism; Fig. 10 is a horizontal section taken substantially on the line 10—10 of Fig. 1; Fig. 11 is a view similar to Figs. 7, 8 and 9 though illustrating a different adjustment of the machine, to-wit that obtaining when the counting means is to be utilized; Fig. 12 is a vertical section taken substantially on the line 12—12 of Fig. 2 with the machine under the same adjustment as in Fig. 11; Fig. 13 is a detail horizontal section taken on the line 13—13 of Fig. 12; Fig. 14 is a view similar to Fig. 11 but with the machine under a different adjustment, to-wit that obtaining when dates or designating numbers are to be printed in one column and amounts in another without bringing into play the counting means; Fig. 15 is a horizontal section taken substantially on the line 15—15 of Fig. 1; Figs. 16 and 17 are detail sections taken respectively on lines 16—16 and 17—17 of Fig. 15; Fig. 18 is a detail plan view of parts appearing in Fig. 17; Fig. 19 is a detail section taken on line 19—19 of Fig. 15; Figs. 20 and 21 are similar left-side elevations of a portion of the machine, one illustrating the effect of depressing the sub-total key appropriated to the right-hand section of the accumulating mechanism and the other illustrating the effect of depressing the sub-total key appropriated to the left-hand section of the accumulating mechanism; Fig. 22 is a detail section on line 22—22 of Fig. 2; Fig. 23 is a section on line 23—23 of Fig. 2; Fig. 24 is a detail section on the line 24—24 of Fig. 1; and Figs. 25 to 30 show different examples of printing of which the machine is capable.

In view of the disclosures in the above-mentioned prior patents and others referred to therein it will not be necessary to go into great detail as to many familiar constructions on which the improvements of the present invention are here shown as grafted. The machine proper is of the familiar Burroughs type in the form of embodiment of the invention here disclosed though it is of course to be understood that the invention is not necessarily confined to adaptation to any particular type of adding and listing machine.

Amount keys 291 as usual control excursions of racks 610 and the forward turning thereby of the adding pinions 916 and associated wheels 918, these being carried in a rocking frame 910 engaged by the usual pitman 914. The latter has coupled to it as usual a vertically-extending link 911 slotted at its upper end where it embraces a stud upon the forwardly-extending arm of a bell crank lever 227 loosely mounted upon a rock shaft 204 extending across the machine under the keyboard. The two grand total keys B' and B² surmount respectively upstanding arms of levers $b$ and $a$, the former affixed to said shaft 204 as indicated in Fig. 2 and the latter loose upon said shaft and both these levers being of bell crank form. Forwardly extending arms of said two levers lie side by side as illustrated in Fig. 2 and on the inner side of the lever 227, they are provided with laterally-projecting pins or studs $a'$ and $b'$, the former on the lever $a$ and the latter on the lever $b$, both projecting over the top of the lever 227 as illustrated in Figs. 1, 5 and 10. This construction is similar to that disclosed in the aforesaid Vincent Patent No. 897,941 and it will be obvious that depression of either of the keys or both together will have the familiar effect of disengaging the pitman 914 from the accumulator frame 910 on the upper side of the latter's rocking center and providing for engagement of said pitman with said frame on the lower side of said rocking center, thus arranging for the taking of a grand total in an operation of the machine. Such an operation of course necessitates release of the racks, which are as usual normally engaged by latches 415 adapted to be individually displaced by amount-key-operated slide strips 214. When the machine is in the normal adjustment as illustrated in Fig. 1 all the latches 415 should be simultaneously displaced in a totaling operation. The keys B' and B² are adapted when separately operated to displace different sections of said latches, through means presently to be described but when the machine is under the normal adjustment these keys should not be separately depressed and hence the present invention provides a lock which normally holds the two keys together, such lock being preferably mounted upon the lever 227 so that depression of either key under the normal adjustment is the same as though that key surmounted an upstanding arm of the lever 227 as in the ordinary construction of Burroughs machines. This lock is in the form of a plate $B^3$ pivoted on the outer side of the lever 227 and formed with a pair of double bayonet slots $a^2$ and $b^2$ embracing the studs $a'$ and $b'$ respectively, said studs normally occupying the forward lateral branches of said slots as illustrated in Fig. 1 so that the two key levers and the lever 227 are locked together. A spring $b^3$ connecting a depending arm of said lock plate with the depending arm of the lever 227 tends to rock the plate forward but is normally restrained from so doing. A link $B^4$ coupled to said depending arm of the lock plate is slotted at its rear end to embrace a stud $b^4$ on the lever 227 and has an upstanding finger $b^5$ which normally bears against a finger $i^2$ secured to the left hand end of a rock shaft I. This engagement between these two fingers is what normally prevents the spring $b^3$ from rocking the lock plate forward. A slide strip or bar E on the underside of the lower keyboard plate 212 is slotted as shown in Figs. 2 and 5 to embrace a finger $i'$ secured to said rock shaft I at its middle. A knob $E'$ secured to the front end of said slide strip or bar protrudes at the front of the keyboard and is adapted to move forward and back along a series of inscriptions as "Normal", "Two total", "Count" and "Date" (see Fig. 10). Fig. 1 shows the knob at its extreme forward position indicating a normal condition of the machine. Movement of the knob rearward to bring its pointer opposite the words "Two total" has the effect of rocking the shaft I so as to swing the finger $i^2$ slightly rearward to the position illustrated in Figs. 7, 8 and 9, thus permitting the spring $b^3$ to rock the lock plate $B^3$ far enough to bring into line with the studs $a'$ and $b'$ those portions of the bayonet slots which open out of the plate and which, when the plate has been so rocked, are concentric with the rock shaft 204. It follows that under such conditions either one of the keys $B'$ or $B^2$ can be depressed without affecting the other key since such concentric portion of the bayonet slot embracing the latter's stud will simply pass along such stud as illustrated in Figs. 8 and 9.

It has been before mentioned that the two keys when separately depressed displace different sections of the rack latches. The construction employed in this connection will next be described, it being premised that such construction quite closely resembles the corresponding construction disclosed in the aforesaid Vincent Patent No. 897,941. Of course the division can be made at any point desired. In the present instance the machine is supposed to be a fifteen-bank machine, that is to say a machine having fifteen rows of amount keys, and the division is made between the seventh and eighth banks counting from the right.

The rock shaft 204 has secured to its right-hand end, as shown in Fig. 5, a depending arm $b^6$ and at an intermediate point a similar arm $b^7$ and these arms are coupled respectively to side-pieces $216^b$ of a bail completed by a cross rod $209^b$, the latter running in front of the latches 415 of the racks associated with the first seven rows or banks of amount keys. It will be obvious that depression of the total key $B'$ by rocking the shaft 204 swings the arms $b^6$ and $b^7$ rearward, thus drawing the said bail rearward and displacing these seven latches so that in the ensuing operation of the machine a total will be taken of the accumulation on the seven right-hand wheels 918 while the balance of the wheels are not affected inasmuch as their racks are not released by displacement of latches. A depending arm $a^3$ of the other total key lever $a$ is connected by a cross bar $a^4$ to a similar arm $a^5$ journaled upon the rock shaft 204 as illustrated in Fig. 5. To said arms $a^3$ and $a^5$ are coupled side-pieces $216^a$ of a bail completed by a cross rod $209^a$ which extends in front of the eight latches to the left. It follows that depression of the total key $B^2$, by swinging rearward the yoke $a^3$—$a^4$—$a^5$, draws rearward the bail $216^a$—$209^a$, and thus displaces said eight latches so that in the ensuing operation of the machine a total will be taken of the accumulation on the eight wheels 918 to the left.

It is desirable, in order to avoid error or derangement of the mechanism, that depression of either key be prevented during an operation of the machine with the other key depressed and also that the depressed key be locked down during the operation. To this end the key levers $a$ and $b$ are formed with depending arms $a^8$ and $b^8$ (Figs. 1 and 5) and these have studs $a^9$ and $b^9$ projecting toward each other and normally in alinement cross-wise of the machine. It has been customary in machines of this type to employ means for preventing depression of a total key during an operation of the machine as well as to prevent the operation of the machine during depression of the total key. In the present instance the lever 227 corresponds with the usual total key lever and it is similarly connected for such purposes as just mentioned. Thus a link $h$ (Fig. 1) connects its depending arm with an arm H secured to a rock shaft 1400 which extends across the machine and at the right-hand end has secured to it a depending arm 1414 co-acting with a curved flange or locking strip 315 on the familiar full-stroke sector 311. This is substantially the construction illustrated and described in the aforesaid Vincent Patent No. 913,860 and it will be obvious that with the rocking of the lever 227 the roller 1435 on the arm 1414 passes from the inner to the outer side of said locking strip and the latter, upon the forward pull of the operating handle, passes down behind the roller, preventing the return of said lever 227. Now in the present instance this same arrangement is utilized through some modification in construction for locking the keys B' and B². It will of course be understood that the locking of the lever 227 does not lock said keys when the plate B³ is adjusted to the "two total" position. And so the arm H is extended upward and carries at its extremity a rearwardly-turned head or beak $h^3$ of sufficient breadth to engage both studs $a^9$ and $b^9$ at the same time. When the machine is operated for other than totaling purposes not only does the lock strip 315 pass down in front of the roller 1435, preventing movement of the lever 227, but the accompanying swing of the arm H carries the beak $h^3$ under the studs $a^9$ and $b^9$, thus locking both keys B' and B² against depression. Then if the "right total" key is depressed as illustrated in Fig. 8 said beak, in an operation of the machine, will pass above the stud $b^9$ and below the stud $a^9$, thus locking the said key down and the other or "left total" key in its normal position. Vice versa, if the left total key is depressed and the machine operated the beak passes over the stud $a^9$ and under the stud $b^9$, thereby locking said key down and the right total key in its normal position.

Sub-total keys C and C' surmount upstanding arms of bell crank levers $c$ and $d$ loose upon a rock shaft 206. These levers lie side by side as illustrated in Fig. 2 and their depending arms are coupled to long bars $216^c$ and $216^d$ respectively, such bars extending to the front of the machine passing on opposite sides of the link 911 as shown in Fig. 24. Each of these bars is of similar character to the one shown in said Vincent Patent No. 913,860 and performs similar functions. In the present instance the stud 950 of the link 911 projects from both sides of the latter as shown in Fig. 24 so as to coöperate on one side with the link $216^c$ and on the other side with the link $216^d$ in the manner illustrated in Figs. 20 and 21. In either case the drawing rearward of the bar by depression of the connected key interposes a high edge of the bar in the path of the stud so that the link 911 is obstructed and the pitman 914 cannot drop so as to become effectively engaged with the lower stud on the accumulator frame. The bar $216^c$ has a lug overlying a stud $c'$ on the depending arm of the bell crank lever $b$ so that when the "right sub-total" key C is depressed it will pull down the right total key B'. Similarly the other bar $216^d$ has a lug engaging a stud $d'$ upon the depending arm $a^3$ of the bell crank lever $a$ whereby when the "left sub-total" key is depressed it will pull down the left total key B².

What is above stated concerning separate operations of the two total or two sub-total keys of course assumes an adjustment of the index knob E' to a position opposite the inscription "Two total," (see Fig. 10). Further movement of said knob rearward will bring it opposite the inscription "Count" and this will bring into play means whereby the three left-hand wheels 918 will be caused to count up the number of times the machine is operated with amount keys depressed. Referring to Fig. 12 the amount keys 291 as usual act upon small bell crank levers 217 to which are connected stop wires 270 for the racks 610. In the present instance the stop wire connections for the "1" key of one bank (in this instance the third bank or row from the left) are modified over those usually employed to provide for the counting operation which calls for repeating the single step movement of a wheel or pinion or of the primary one of a set of wheels or pinions. In the present instance the modification in stop wire connections being in the third bank from the left, three wheels are employed to register the count and the primary wheel is of course that one farthest to the right. The bell crank $217^a$ (Figs. 11 and 12) on which the "1" key above referred to operates does not connect directly with the associated stop wire $270^a$ but has a one-way engagement with an arm $z$ on the same cross shaft 200 on which said bell crank is loosely mounted, which engagement may be effected by means of a stud $z'$ (Fig. 13) on the bell crank acting against the front edge of said arm. The stop wire $270^a$ is connected to said arm, from which it will be obvious that depression of this "1" key will result in retracting said stop wire in the usual way, but it is obvious the stop wire may be retracted by rearward movement of the arm independently of the key bell crank and it is adapted to be so retracted for the purposes of the counting operation. The arm $z$ has at its lower extremity a finger $z^2$ (Fig. 13) projecting laterally to the left behind a plate Z which is mounted to rock loosely upon the aforesaid shaft 200 and act with its rear edge against said finger $z^2$ to effect the retraction of the stop wire. Said plate is normally held forward and upward by a spiral spring $z^3$ in an inoperative position. A spring-held bail 424 similar to that commonly employed in Burroughs machines is constructed and arranged as usual to be swung rearward by any one of the detent strips 214, each of the latter having a downturned lip $214^a$ bearing against cross rod 402 of this bail. In the present instance the bail has an additional intermediate arm 424$^a$ which, at a point just above the cross rod 402 is formed with a flange $z^4$ projecting to the right, (Fig. 12), and adapted to act against the forward edge of the plate Z, though under normal conditions it passes freely under said plate. Under the lower keyboard plate 212 there is slidingly mounted a strip or bar Z', which near its forward end is formed with a downwardly projecting cam portion $z^5$ adapted when the plate is slid rearward to act upon a roller $z^6$ (Fig. 23) carried by an arm $z^7$ integral with the plate Z (Fig. 2), and thereby lower said plate far enough to bring its front edge directly behind the flange $z^4$ of the bail arm 424$^a$. The cam portion $z^5$ of said strip or bar Z' is sufficiently flattened at its apex to preserve the adjustment and it will be seen that depression of any amount key by swinging the bail 424 rearwardly will cause the plate Z to be swung rearwardly, carrying with it the arm $z$ by reason of the engagement between the rear edge of the plate and the finger $z^2$ of said arm. This retracts the stop wire 270$^a$ as shown in Fig. 12 and provides for a drop of the associated rack 610 the correct distance for registering "1" on the associated number wheel when the rack is returned to normal. It will thus be seen that by sliding the strip or bar Z' rearward the machine will be adjusted for registering the count of itemizing operations, it being understood that the count accumulations are carried to the leftmost wheel through the usual transfer mechanism.

The rearward sliding of the slide strip or bar Z' is accomplished through suitable connection with the slide strip or bar E. It has been before explained that rearward movement of said slide strip E to the "two total" position turns the rock shaft I. Further rearward movement of said slide strip E to the count position of course turns said rock shaft still farther. The accompanying further rearward swinging of the finger $i^2$ permits the spring $b^3$ to rock the lock plate B$^3$ to the position shown in Fig. 11 where the rear branches of the slots $a^2$ and $b^2$ will embrace the studs $a'$ and $b'$, thus again locking the two keys B' and B$^2$ together and to the lever 227. The rock shaft I carries at an intermediate point a slotted arm $z^8$ (see dotted lines Figs. 1, 7 to 9 and 11 and 12, and also see Figs. 4. 10 and 23) which engages a stud on a downturned lip $z^9$ of the slide strip Z'. Normally the cam portion $z^5$ of the latter is spaced from the roller $z^6$ so that movement of the knob E' to the "two total" position, though accompanied by movement of the slide strip Z', does not cause said cam portion $z^5$ to act upon said roller. However, further movement of the knob E' to the "count" position by causing further rearward movement of said slide strip Z' does cause said cam portion $z^5$ to act upon said roller $z^6$ with the effect above described.

The transfer or carrying mechanism is of the usual form, the racks 610 having slot-and-pin-and-spring connections with levers 611 and being normally held back by pawls 413 engaging studs 414 on the racks, said pawls adapted to be displaced by studs 916$^a$ on the pinions 916 (Fig. 6). In order to guard against a possible miscount of operations when the machine is adjusted for utilization of the three left-hand wheels for counting purposes, by reason of transfer actuation of the right-hand one of those three wheels, means are provided for disabling the transfer mechanism between such right-hand wheel and the next adjacent wheel to the right, whenever the machine is adjusted for counting purposes. Thus, the rack belonging to the pinion of said right-hand counting wheel is prevented from partaking of extra movement, notwithstanding the regular pawl restraining that rack may be displaced by the transfer projection of the next pinion to the right and said pawl latched in its displaced position in the regular way. Referring to Fig. 6, the reference numeral 413$^c$ designates an auxiliary pawl mounted upon the same pivot stud that supports the regular pawl 413, said auxiliary pawl having a finger $w$ adapted to engage over the stud 414 of the rack belonging to the right-hand counting wheel. Under a normal adjustment of the machine this finger stands in rear of said stud, though a spiral spring $w'$ attached to the auxiliary pawl tends to draw said finger over the stud to the position shown in Fig. 6. The pawl has an angular arm $w^2$ extending above its pivot and presenting a rear edge $w^3$ to a roller $w^4$ on the depending arm $w^5$ of a bell crank lever having a forwardly projecting arm $w^6$ carrying a roller $w^7$ adapted to be acted upon by the cam-projection $z^5$ which is wide enough for the purpose. A spring $w^9$ draws the bell crank arm $w^5$ forward and, being superior to the spring $w'$ or acting on the auxiliary pawl through greater leverage, normally holds the lower arm of the pawl rearward, so that the finger $w$ will not obstruct the stud 414, but the latter may pass into a notch $w^{10}$ of the auxiliary pawl. Normally the roller $w^7$ lies against a plain portion of the strip Z' (Fig. 23) but when said strip is moved rearward by movement of the strip E to the "count" position, as shown in Fig. 6, the cam $z^5$ acts upon said roller, rocking the bell crank and permitting spring $w'$ to draw the finger $w$ over the stud 414.

Organized as is the machine here disclosed the wheels next adjacent those used for counting purposes would not, under the "count" adjustment of the machine, be accumulating to any purpose as the rows or banks of keys associated with such wheels would, if in use at all, be employed merely for setting up designating numbers or the like. Hence the turning of the highest wheel of such group beyond its capacity without carrying to the next higher wheel, the latter being the unit counting wheel, would be of no consequence.

Passing now to the printing mechanism of the machine its general organization is that regularly employed in Burroughs machines. Thus hammers 715 are pivotally mounted to strike type plates 618 carried on the rear portions of the levers 611 driving such type plates against a roller platen 17. Driving levers 716 engage the hammers and have actuating springs 780 applied to them but are normally restrained by the usual hammer-restoring bail 712. Latches 717 normally engage the hammer driving levers and pawls 718 overlie said latches respectively, said pawls being carried by a vibrating bail 711 and having upturned tail portions adapted to co-act with cam edges $y$ of the levers 611 so that when the latter do not move far enough to present digit type at the printing line the pawls 718 will be disabled. For the most part the latches 717 have the usual laterally-turned tails $v$ (Fig. 15) overlapping adjacent latches to the right to provide for successive tripping of latches one by another in order to fill in ciphers in decimal places of numbers or amounts where no digits occur.

For the purposes of the present invention provision is made for sub-division in the printing mechanism in the matter of successive tripping of latches so that when the machine is under the "two total" adjustment no ciphers will be printed between the two columns of amounts or between the two totals and further so that under the "count" adjustment no ciphers will be printed between the count total and the amount total. At the same time there should be a successive tripping throughout the series of latches when the machine is under the "normal" adjustment; and under the "date" adjustment when designating numbers might be employed of high denomination there should be successive tripping of latches from the leftmost one to the point of sub-division which provides for the listing of amounts opposite designating numbers. This latter condition should also obtain when the machine is under the "two total" adjustment. Therefore, between certain of the latches coupling devices are employed and such latches are coupled together or uncoupled according to the adjustment of the knob E'. In the present instance these coupling devices are employed between the seventh and eighth and twelfth and thirteenth latches counting from the left (see Fig. 15). As the construction of the coupling devices is the same at each location a description of one set will suffice. This comprises a pitman $x$ pivoted to the left-hand latch of the pair and bifurcated to slide upon a cross rod X; and a pitman $x'$ pivoted to the right-hand latch of the pair also sliding upon the cross rod X and having pivotally mounted upon it a coupler member $x^3$. The latter is formed with a laterally-turned lip or flange $x^4$ and a spring $x^5$ normally upholding this coupling member holds said lip in engagement with a shoulder $x^6$ of the pitman $x$ as illustrated in Figs. 16 and 17. It will be obvious that by depressing the said coupling member the pitman $x$ may be prevented from transmitting movement to the pitman $x'$ when the left-hand latch is rocked and consequently the right-hand latch will not be affected.

Journaled between the side frames of the printing mechanism is a rock shaft G (Figs. 15 to 17) and on this rock shaft is formed at one point a segmental cam projection $g$ (Fig. 16) and at another point a less extensive tapered cam projection $g'$ (Fig. 17). These two cam projections are so located relatively to each other circumferentially of the rock shaft that the latter may be turned so as to cause the projection $g$ to displace the coupling member of the right-hand set without displacing the coupling member of the left-hand set. Then by further turning of the rock shaft the projection $g'$ may be caused to displace the coupling member of the left-hand set while the projection $g$ still displaces the coupling member of the right-hand set. By still further turning the rock shaft the projection $g'$ may be carried beyond the left-hand coupling member so as to permit the latter to restore the connection between the latches while at the same time the projection $g$ still continues to hold the right-hand coupling member displaced.

The rock shaft G is controlled by the slide strip or bar E, the latter being formed at its rear portion with a series of steps $e$, $e'$, $e^2$ with inclined or cam surfaces between. A thrust bar F mounted to slide vertically has a roller $f$ at its upper end held by a spring F' in engagement with said strip E. This bar F at its lower extremity is pivoted to a segmental gear G' mounted upon the framework and meshing with a pinion $G^2$ on the rock shaft G as clearly shown in Fig. 1. Normally the roller $f$ is against a plain rear surface of the slide strip E as shown in Fig. 1 so that the thrust bar F is at its highest location and the rock shaft G permits engagement of both coupling members $x^3$ with the pitmen $x$. Hence of course successive tripping of latches may take place throughout the series, so that work such as illustrated in Fig. 25 can be produced. When the knob E' is thrust rearward to the "two total" position the cam edge of the slide strip E leading to the first step or shoulder $e$, by acting upon the roller $f$ thrusts the bar F downward thereby rocking the gear segment G' and turning the rock shaft G far enough to displace the right-hand coupler member as illustrated in Fig. 7. Hence two separate columns of amounts can be printed and separate totals under the same, either simultaneously as represented in Fig. 26 or in different operations of the machine as illustrated in Fig. 27, without ciphers between the columns or the totals. Further rearward movement of the knob E' to the "count" position illustrated in Fig. 11 causes the next cam surface of the slide strip E' to act upon the roller $f$ and thrust the bar F farther downward, causing the cam projection $g'$ on the rock shaft G to displace the coupler member of the left-hand set while the other cam projection $g$ continues to displace the coupler member of the right-hand set. Hence work such as illustrated in Fig. 28 can be produced, the right-hand column representing amounts and the left-hand column designating numbers, while the left-hand total is the count of itemizing operations and the right-hand total is that of the amounts listed in the right-hand column and no ciphers are printed between the columns or the totals. The elimination of a total imprint below the left-hand column will be later explained as also the elimination of individual imprints of the successive counts. Further adjustment of the knob E' to the "date" position causes a third cam surface of the slide strip E to further move the bar F downward, thus further turning the rock shaft G and carrying the cam projection $g'$ beyond the left-hand coupler member while the cam projection $g$ continues to displace the right-hand coupler member. Consequently, work such as illustrated in Fig. 29 can then be done, the right-hand column representing amounts and the left-hand column designating numbers of high denomination, or work can be done such as illustrated in Fig. 30 where the left-hand column represents dates. In either case a total below the left-hand column is eliminated while a total is printed below the right-hand column.

Referring next to the matter of elimination of a total imprint below the column of designating numerals under a "count" adjustment of the machine when work such as illustrated in Fig. 28 is being performed, this is accomplished under control of the knob E' and the totaling devices. An arm 227$^a$ is secured to and depends from the rock shaft 206 as shown in Fig. 1 and there is secured to this same rock shaft another depending arm N which is formed at its lower extremity with a broadened portion or foot $n$ (see Fig. 15). The arm 227$^a$ is coupled by a link 226 with the bell crank lever 227 from which it follows that whenever a total or sub-total key is depressed the arm 227$^a$ will be swung rearward accompanied by the arm N. An irregular-shaped lever M pivoted to the framework intermediate its ends has pivotally connected to the extremity of its up-turned arm a link M' which is slotted to embrace a stud $f^3$ on the thrust bar F as shown by dotted lines in Fig. 1 and full lines in Figs. 7, 8, 9, 11 and 14. An upwardly-projecting branch of said link has a stud $m^3$ adapted, under certain circumstances, to be acted upon by the foot $n$ of the arm N when a total or sub-total key is depressed. Normally this does not take place because the stud $m^3$ as shown in Fig. 1 is above the arc of movement of said foot. Neither does it take place when the machine is operating under the "two total" adjustment, although the thrust bar F has been lowered to some extent and the link M' correspondingly swung down, (see Figs. 8 and 9). However, when the knob E' is moved farther rearward to the "count" position the further lowering of the thrust bar F does bring said stud $m^3$ in the path of movement of the foot $n$, as shown in Fig. 11, so that depression of a total or sub-total key by swinging the arm N rearward will cause the link M' to be drawn rearward, thereby rocking the lever M. This lever in rear of its pivot carries a long stud M$^2$ (see Fig. 15), said stud overlying the front portions of the eight latches to the left but being cut out or flattened where it extends over three of these latches which are farthest to the left and which are concerned in the printing of the "count" total. The rocking of the lever M in the manner described causes the stud M$^2$ to rock the five intermediate latches as illustrated in Fig. 11 though owing to the cutting away or flattening of the stud the other three latches referred to are not affected. The result of thus rocking the five intermediate latches is to disengage them from the corresponding hammer drivers and so permit the latter to follow up the restoring bail 712 as it retreats in an operation of the machine so that the connected hammers will do no printing, being deprived of any percussive action. Now under the "date" adjustment of the machine not only are the hammers associated with said five intermediate latches disabled but also the three hammers to the left. The further rearward movement of the slide strip E when the knob E' is adjusted to the "date" position, in thrusting the bar F farther down swings the link M' farther down but the stud $m^3$ still lies in the path of the foot $n$ of the arm N so that upon depression of a total or sub-total key the link will be operated upon and the lever M rocked. Said link has a downwardly-extending branch M⁴, (see particularly Fig. 14), with a stud m⁶ at its lower end, which, when the link is further swung downward as stated, acts upon the inclined or cam edge of a plate or bar M⁵ slidingly mounted upon the rear arm of the lever M and normally drawn forward by a spring m⁷. The rear extremity of this sliding plate or bar is bifurcated as shown at m⁸ to engage a laterally-projecting stud on an up-turned lip m⁹ of a rocking plate or blade M⁶, the latter secured to a rock shaft M⁷ journaled between the side frame-pieces of the printing mechanism as clearly shown in Fig. 15. This blade has a forwardly-projecting part corresponding in extent to the lateral area occupied by the eight hammers of the left-hand group as shown in Fig. 15. Normally this blade stands in a position to offer no obstruction to these hammers, being held up to such position by a spring m″ as illustrated in Fig. 1, and normally the slide plate or bar M⁵ is forward as also shown in this figure of the drawings so that its bifurcated rear end is disconnected from the blade and rocking of the lever M in a totaling operation under the "count" adjustment has no effect upon said blade. However, under the "date" adjustment the said slide strip or bar is slid rearwardly in the manner described so that its bifurcated end engages said blade as illustrated in Fig. 14. Then upon the rocking of the lever M in a totaling operation the said blade will be rocked down to the position shown in Fig. 14, its forwardly-projecting edge being brought behind shoulders of the hammers so that the latter cannot act, although their latches may be tripped.

As it is not desirable to print a row of "1's" when the machine is operating under the counting adjustment, special provision is made for disabling the pawl 718 which would ordinarily trip the printing hammer belonging to the third bank from the left. This particular pawl is provided with a stud y′ (Fig. 12), projecting laterally from its tail portion for coaction with the angular lower edge of one arm of a bell crank lever Y pivoted on a cross rod 200ᵃ and carrying at the extremity of its other arm a roller y². A strip or bar Y′ is mounted to slide on the under-side of the lower keyboard plate 212 and coöperate with said roller, this strip having two downwardly-projecting cam portions y³ y⁴ with flattened apexes and a depression between them. A spiral spring y⁵ tends to draw the bell crank Y forward to effective position but normally the strip Y′ stands forward with its rearward cam projection y³ over the roller y², (see Fig. 1), which has the effect of holding the lower end of the bell crank so far rearward and upward as to have no effect upon the pawl 718. When, however, said strip Y′ is moved part way rearward, accompanying movement of the knob E′ to the "count" position, the depression in said strip Y′ permits the bell crank lever Y to assume the effective position illustrated in Fig. 12, so that in an operation of the machine the pawl 718 will be disabled through coaction between its stud y′ and the angular lower edge of said lever.

When a total of the count is to be printed in connection with the total of accumulated amounts, it becomes necessary to displace the bell crank lever Y and to this end there is secured to the rock shaft 204 a rearwardly-curved arm Y² (Fig. 12) whose rear edge is adapted to act against a roller stud y⁶ on said bell crank lever Y with the effect illustrated in Fig. 11, where the lower end of said bell crank lever Y is shown carried away from the pawl 718, leaving the latter free to trip its latch. It will be understood that under the "count" adjustment the two total keys are locked together so that the key B′ is necessarily depressed in a totaling or sub-totaling operation and hence the shaft 204 will be rocked.

The slide strip Y′ is moved through connection with the slide strip E as illustrated more particularly in Figs. 2, 4, 10 and 22. The rock shaft I which is turned by said strip E has fastened to its right-hand end an arm y⁷ bifurcated to embrace a stud on a down-turned lip y⁸ of the slide strip Y′. It will be noted that the cam portion y³ is relatively long and the roller y² normally bears aginst the rear part thereof as illustrated in Fig. 22. When the knob E′ is moved to the "two total" position the accompanying rearward movement of the slide strip Y′ produced by the action thereon of the arm y⁷ is insufficient to carry the high portion of the cam y³ rearwardly beyond the said roller y². Consequently, the lever Y remains in the ineffective position illustrated by dotted lines in Fig. 1. However, movement of the knob E′ to the "count" position does move the said slide strip Y′ far enough to carry its cam portion y³ beyond said roller to the position illustrated by dotted lines in Fig. 11 so that the lever Y will then move to effective position as illustrated in Fig. 12. Further movement of the knob E′ to the "date" position carries the strip Y′ still farther rearward with the effect of returning the lever Y to its ineffective position by reason of the operation of the cam portion y⁴ upon the roller y⁶.

It will now be seen that the constructions above described are well calculated to accomplish the various purposes stated at the outset of this specification. It is to be understood, however, that the invention is not necessarily limited to these exact constructions, which are susceptible of modification without departure from the essential characteristics of the invention.

What I claim is:

1. In a machine of the character described, the combination of accumulating mechanism; printing devices coöperatively related for the automatic filling in of ciphers; means for suspending such coöperative action at will at a predetermined point; and totaling means sectionally operable to print totals independently of each other on opposite sides of such point.

2. In a machine of the character described, the combination of accumulating mechanism; printing devices coöperatively related for the automatic filling in of ciphers; means for suspending such coöperative action at will at a predetermined point, totaling means sectionally operable to print totals independently of each other on opposite sides of such point; and manipulative means normally preventing such independent printing of totals but adjustable to permit the same and suspend the coöperative action of printing devices.

3. In a machine of the character described, the combination of accumulating mechanism; type-carriers; hammers; latches restraining the latter and coöperatively related for cipher-printing, with coupling devices between certain latches; means for disconnecting the coupling devices; and totaling means sectionally operable to print totals independently of each other on opposite sides of such point of disconnection.

4. In a machine of the character described, the combination of accumulating mechanism; type-carriers; hammers; latches restraining the latter and coöperatively related for cipher-printing, with coupling devices between certain latches; totaling means sectionally operable to print totals independently of each other on opposite sides of the said coupling devices; and manipulative means normally preventing such independent printing of totals but adjustable to permit the same and disconnect the latch-coupling devices.

5. In a machine of the character described, the combination of accumulating mechanism; printing devices coöperatively related for the automatic filling in of ciphers; means for suspending such coöperative action at will at a predetermined point; and totaling means sectionally operable to print totals independently of each other on opposite sides of such point, said latter means comprising separately depressible keys.

6. In a machine of the character described, the combination of accumulating mechanism; printing devices coöperatively related for the automatic filling in of ciphers; means for suspending such coöperative action at will at a predetermined point; totaling means sectionally operable to print totals independently of each other on opposite sides of such point, said latter means comprising separately depressible keys; and manipulative means normally preventing depression of said keys separately but adjustable to permit the same and suspend the coöperative action of printing devices.

7. In a machine of the character described, the combination of accumulating mechanism; type-carriers; hammers; latches restraining the latter and coöperatively related for cipher-printing, with coupling devices between certain latches; totaling means sectionally operable to print totals independently of each other on opposite sides of the said coupling devices, said means including separately depressible keys; and manipulative means normally preventing depression of said keys separately but adjustable to permit the same and disconnect the latch-coupling devices.

8. In a machine of the character described, the combination of accumulating mechanism; printing devices coöperatively related for the automatic filling in of ciphers; means for suspending such coöperative action at will at a predetermined point; totaling means sectionally operable to print totals independently of each other on opposite sides of such point, said latter means comprising separately depressible keys; a lock normally preventing separate depression of said keys; and manipulative means for disabling said lock and suspending the coöperative action of said printing devices.

9. In a machine of the character described, the combination of accumulating mechanism; type-carriers; hammers; latches restraining the latter and coöperatively related for cipher-printing, with coupling devices between certain latches; totaling means sectionally operable to print totals independently of each other on opposite sides of the said coupling devices, said means including separately depressible keys; a lock normally preventing separate depression of said keys; and manipulative means for disabling said lock and disconnecting the latch-coupling devices.

10. In a machine of the character described, the combination with adding means and total-taking means sectionally operable, of manipulative means normally preventing sectional operation of the total-taking means.

11. In a machine of the character described, the combination of racks and pinions engageable and disengageable; a movable member for changing the periods of engagement and disengagement thereof; depressible keys capable of separately acting upon said member; and a lock normally connecting the latter and both of said keys.

12. In a machine of the character described, the combination of racks and pinions engageable and disengageable; a movable member for changing the periods of engagement and disengagement thereof; depressible keys capable of separately acting upon said member, a lock normally connecting the latter and both of said keys; and manipulative means for disabling the said lock.

13. In a machine of the character described, the combination of racks and pinions engageable and disengageable; a total lever and connections for changing the periods of engagement and disengagement thereof; depressible keys with projections to act on said lever; and a movable lock-plate on the latter engaging said projections to normally prevent independent depression of the keys.

14. In a machine of the character described, the combination of racks and pinions engageable and disengageable; a total lever and connections for changing the periods of engagement and disengagement thereof; depressible keys with projections to act on said lever; a movable lock-plate on the latter engaging said projections to normally prevent independent depression of the keys; a spring applied to said lock-plate; and a movable abutment member restraining said spring.

15. In a machine of the character described, the combination of racks and pinions engageable and disengageable; a total lever and connections for changing the periods of engagement and disengagement thereof; depressible keys with projections to act on said lever; a movable lock-plate on the latter engaging said projections to normally prevent independent depression of the keys; a spring applied to said lock-plate; a movable abutment member restraining said spring; and an indexing slide controlling said abutment member.

16. In a machine of the character described, the combination of racks and pinions engageable and disengageable; a total lever and connections for changing the periods of engagement and disengagement thereof; depressible keys with projections to act on said lever; a pivoted lock-plate on the latter, bayonet-slotted to engage the said projections; a link coupled to said plate; a spring applied to the latter; a rock-shaft having an arm engaging said link and an operating arm; and an indexing slide engaged with the latter.

17. In a machine of the character described, the combination of accumulating mechanism; type-carriers; hammers; latches restraining the latter and coöperatively related for cipher-printing, with coupling devices between certain latches; means for disconnecting the coupling devices including a shaft having a cam-projection and gear; and an indexing slide adapted to rock said gear.

18. In a machine of the character described, the combination of accumulating mechanism; type-carriers; hammers; latches or detents restraining the latter and coöperatively related for cipher-printing, with coupling devices between certain latches; means for disconnecting the coupling devices including a shaft having a cam-projection; a gear on the shaft and a gear segment; an indexing slide having a cam; and a bar operated by the latter and coupled to the segment.

19. In a machine of the character described, the combination of racks and pinions engageable and disengageable; a movable member for changing the periods of engagement and disengagement thereof; depressible keys capable of separately acting upon said member; a lock normally connecting the latter and both of said keys; type carriers connected with the racks; hammers; latches or detents restraining the hammers and coöperatively related with coupling devices between certain latches; and an indexing slide adapted to disconnect said coupling devices and disable the aforesaid lock.

20. In a machine of the character described, the combination of a series of axially alined adding wheels; means for differentially turning the same; type-carriers movable coördinately with said wheels; means for causing certain of the latter to count the collective turnings of the others; and means for taking totals independently from different denominational sections of the wheels.

21. In a machine of the character described, the combination of a series of axially alined adding wheels; means for differentially turning the same; type-carriers movable coördinately with said wheels; means for causing certain of the latter to count the collective turnings of the others; means for taking totals independently from different denominational sections of the wheels; and impression devices for the type-carriers coöperatively related for cipher-printing in such sections and having provision for interruption at will of coöperative action at a point in one of said sections to provide for printing the count total.

22. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; and controlling devices for bringing said latter means into play.

23. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; and controlling devices for bringing said latter means into play and locking the said keys against independent depression.

24. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the divison in the rack latches and at another point corresponding to the division in the pinions for counting; and controlling devices for enabling the counting means and effecting the suspension of coöperative action of impression means at both said points.

25. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; and controlling devices for enabling the counting means and effecting the suspension of coöperative action of impression means at both said points and locking the said keys against independent depression.

26. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; and controlling devices normally preventing independent depression of the aforesaid keys but adjustable to release the latter and suspend the coöperative action of impression devices at the first point, and further adjustable to again prevent independent depression of the keys and suspend coöperative action of the impression devices at the second point and enable the counting means.

27. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; and controlling devices normally preventing independent depression of the aforesaid keys but adjustable to release the latter and suspend the coöperative action of impression devices at the first point, and further adjustable to again prevent independent depression of the keys and suspend coöperative action of the impression devices at the second point and enable the counting means and disable the impression devices between the two points of suspension, under control of the said keys.

28. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; and controlling devices normally preventing independent depression of the aforesaid keys but adjustable to release the latter and suspend the coöperative action of impression devices at the first point, and further adjustable to again prevent independent depression of the keys and suspend coöperative action of the impression devices at the second point and enable the counting means and disable the impression devices between the two points of suspension, under control of the said keys; said controlling devices by a still further adjustment disabling the counting means, restoring coöperating action of impression devices at the second point, and disabling the impression devices on the count side of such point, under control of the keys.

29. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; impression devices coöperatively related for cipher-printing with means for suspending coöperative action at a certain point corresponding with the division in the latches; and controlling devices normally locking the said keys against independent depression but adjustable to release them and effect suspension of coöperative action of impression devices at the said point, and further adjustable to disable the impression devices to one side of such point.

30. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; impression devices coöperatively related for cipher-printing with means for suspending coöperative action at a certain point corresponding with the division in the latches; and controlling devices normally locking the said keys against independent depression but adjustable to release them and effect suspension of coöperative action of impression devices at the said point, and further adjustable to disable the impression devices to one side of such point and relock the keys.

31. In a machine of the character described, the combination with adding wheels, actuators therefor and type-carriers, all coöperating to accumulate totals on the wheels and set up the individual items in type; of printing device coöperatively related in sections for cipher printing; totaling means sectionally operable to separately print totals collected by different sections of adding wheels; and manipulative means for causing a section of the printing devices to be disabled by the totaling means.

32. In a machine of the character described, the combination with adding wheels, actuators therefor and type-carriers, all coöperating to accumulate totals on the wheels and set up the individual items in type; of printing devices coöperatively related in sections for cipher printing; totaling means sectionally operable to separately print totals collected by different sections of adding wheels; manipulative means for preventing sectional operation of the totaling means; and means for disabling a section of the printing devices by the said totaling means, under control of said manipulative means.

33. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing devices coöperatively related in sections for cipher-printing corresponding with the sections of latches; and manipulative means for causing a section of the printing devices to be disabled by depression of said keys.

34. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing devices coöperatively related in sections for cipher-printing corresponding with the sections of latches; manipulative means for preventing independent depression of the aforesaid keys; and means for disabling a section of printing devices by operation of said keys when so prevented from being independently depressed.

35. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing hammers; a movable member for disabling a section of said hammers; and manipulative means for operatively connecting said member and said keys.

36. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing hammers; a movable member for disabling a section of said hammers; and manipulative means for operatively connecting said member and said keys and preventing independent depression of the latter.

37. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing-hammers; a movable member for intercepting a section of said hammers; and manipulative means for operatively connecting said member and said keys.

38. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing devices coöperatively related in sections for cipher-printing corresponding with the sections of latches; an arm swung by depression of the aforesaid keys; a lever for disabling a section of the printing devices having a link movable into coöperative relation with said arm; and manipulative means for so moving said link.

39. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing devices coöperatively related in sections for cipher-printing corresponding with the sections of latches; an arm swung by depression of the aforesaid keys; a lever for disabling a section of the printing devices having a link movable into coöperative relation with said arm; manipulative means for so moving said link; and a lock controlled by said manipulative means for preventing independent depression of said keys.

40. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; type-carriers connected with the racks; printing hammers; a bar for intercepting a section of said hammers; a lever for operating said bar having a link; an arm swung by the aforesaid keys; and manipulative means for moving the said link into line with said arm.

41. In a machine of the character described, the combination with adding wheels, actuators therefor and type-carriers, all coöperating to accumulate totals on the wheels and set up the individual items in type; of printing devices coöperatively related for cipher-printing with means for suspending coöperative action at will at a certain point to divide the printing devices into sections corresponding to the adding wheel sections; totaling means sectionally operable to separately print totals collected by different sections of adding wheels; and controlling devices normally preventing such sectional operation of the totaling means but manipulative to permit the same and effect suspension of coöperative action of printing devices at the point mentioned, and further manipulative to again prevent the sectional operation of totaling means while continuing the suspension of coöperative action of printing devices.

42. In a machine of the character described, the combination with adding wheels, actuators therefor and type-carriers, all coöperating to accumulate totals on the wheels and set up the individual items in type; of printing devices coöperatively related for cipher-printing with means for suspending coöperative action at will at a certain point to divide the printing devices into sections corresponding to the adding wheel sections; totaling means sectionally operable to separately print totals collected by different sections of adding wheels; controlling devices normally preventing such sectional operation of the totaling means but manipulative to permit the same and effect suspension of coöperative action of printing devices at the point mentioned, and further manipulative to again prevent the sectional operation of totaling means while continuing the suspension of coöperative action of printing devices; and means brought into play by such further manipulation of the controlling devices and operated by the totaling means to disable a section of the printing devices.

43. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; printing devices coöperatively related for cipher-printing with means for suspending coöperative action at will at a certain point to divide the printing devices into sections corresponding to the latch sections; and controlling devices normally preventing independent depression of the aforesaid keys but manipulative to permit same and effect suspension of coöperative action of printing devices at the point mentioned, and further manipulative to again prevent independent depression of the keys while continuing such suspension of coöperative action of printing devices.

44. In a machine of the character described, the combination of racks, latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; printing devices coöperatively related for cipher - printing with means for suspending coöperative action at will at a certain point to divide the printing devices into sections corresponding to the latch sections; controlling devices normally preventing independent depression of the aforesaid keys but manipulative to permit same and effect suspension of coöperative action of printing devices at the point mentioned, and further manipulative to again prevent independent depression of the keys while continuing such suspension of coöperative action of printing devices; and means brought into play by such further manipulation of the controlling devices and operated by the keys to disable a section of the printing devices.

45. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher - printing with means for suspending the coöperative action at a point corresponding to the division in the rack latches and at another point corresponding to the division in the pinions for counting; an arm swung by the keys; a lever having a member for disabling the impression devices between the said two points, and having a link; and controlling devices manipulative to enable the counting means and move said link into line with said arm whereby upon depression of said keys the said lever will be moved and its disabling member will take effect.

46. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; an arm swung by the keys; a lever having a member for disabling the impression devices between the said two points and a member movably mounted upon it for disabling the count impression devices, said lever having a pivotally connected link; and controlling devices manipulative to enable the counting means and to move said link into line with said arm whereby upon depression of said key the said lever will be moved and its first-mentioned disabling member will take effect, said controlling devices being further manipulative to disable the counting means and enable the second-mentioned disabling member of said lever.

47. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; hammers; latches for the latter coöperatively related in sections to correspond with the sections of rack latches and the division in the pinions for counting; an arm swung by the keys; a lever having a bar to displace the hammer latches of the middle section; a movable bar to intercept the count hammers; a slide-piece on said lever adapted to engage said movable bar; a link pivoted to the lever and adapted to be moved into line with the aforesaid arm and to act upon said slide-piece; and controlling devices manipulative to enable the counting means and move said link into line with said arm and further manipulative to disable the counting means and engage said slide-piece with said hammer-intercepting bar.

48. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; an arm swung by the keys; a lever having a member for disabling the impression devices between the said two points, and having a link; a thrust bar connected to said link; and a cam bar engaging said thrust bar and having a manipulating knob.

49. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; impression devices coöperatively related for cipher-printing with means for suspending the coöperative action at a point corresponding to the division in the rack latches and at another point corresponding to the division in the pinions for counting; an arm swung by the keys; a lever having a member for disabling the impression devices between the said two points and a member movably mounted upon it for disabling the count impression devices, said lever having a pivotally connected link movable into line with said arm and further movable to displace said last-mentioned disabling member; a thrust bar connected to said link; and a slide bar having graduated cams to act on the thrust-bar and equipped for manipulation.

50. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; hammers; latches for the latter coöperatively related in sections to correspond with the sections of rack latches and the division in the pinions for counting; an arm swung by the keys; a lever having a bar to displace the hammer latches of the middle section; a movable bar to intercept the count hammers; a slide-piece on said lever adapted to engage said movable bar; a link pivoted to the lever and adapted to be moved into line with the aforesaid arm and to act upon said slide-piece; a thrust bar connected to said link; and a slide bar having graduated cams to act on the thrust bar and equipped for manipulation.

51. In a machine of the character described, the combination of racks; latches for the same; pinions movable into and out of engagement with said racks; means for varying the periods of engagement and disengagement between racks and pinions including separately depressible keys, and a lever engaged thereby; a lock on said lever normally engaging both said keys but movable to release the same and further movable to engage them; means for causing one or more of the pinions to count the collective turnings of the others; type-carriers connected with the racks; impression devices coöperatively related in sections corresponding with the latch sections and the section of counting pinions; an arm swung by the aforesaid lever; a lever having a member for disabling the impression devices of the middle section; a link connected to said last-mentioned lever; and controlling devices manipulative to unlock the keys and further manipulative to relock the same, enable the counting means and move the said link into line with the said arm to cause the second-named lever to be operated by depression of the keys and its disabling member to take effect.

52. In a machine of the character described, the combination of racks; latches for the same; pinions movable into and out of engagement with said racks; means for varying the periods of engagement and disengagement between racks and pinions including separately depressible keys and a lever engaged thereby; a lock on said lever normally engaging both said keys but movable to release the same and further movable to engage them; means for causing one or more of the pinions to count the collective turnings of the others; type-carriers connected with the racks; impression devices coöperatively related in sections corresponding with the latch sections and the section of counting pinions; an arm swung by the aforesaid lever; a lever having a member for disabling the impression devices of the middle section and a member movably mounted upon it for disabling the count impression devices, said lever having a pivotally connected link; and controlling devices manipulative to unlock the keys and further manipulative to relock the same, enable the counting means and move the said link into line with the said arm to cause the second-named lever to be operated by depression of the keys and its disabling member to take effect, said controlling devices being still further manipulative to disable the counting means and enable the second-mentioned disabling member of said lever.

53. In a machine of the character described, the combination of racks; latches for the same; pinions movable into and out of engagement with said racks; means for varying the periods of engagement and disengagement between racks and pinions including separately depressible keys and a lever engaged thereby; a lock on said lever normally engaging both said keys but movable to release the same and further movable to engage them; means for causing one or more of the pinions to count the collective turnings of the others; type-carriers connected with the racks; hammers; latches for the latter coöperatively related in sections to correspond with the sections of rack latches and the division in the pinions for counting; an arm swung by the keys; a lever having a bar to displace the hammer latches of the middle section; a movable bar to intercept the count hammers; a slide-piece on said lever adapted to engage said movable bar; a link pivoted to the lever and adapted to be moved into line with the aforesaid arm and to act upon said slide-piece; and controlling devices manipulative to unlock the keys and further manipulative to relock the keys and enable the counting means and move said link into line with said arm, and still further manipulative to disable the counting means and engage said slide-piece with said hammer-intercepting bar.

54. In a machine of the character described, the combination of racks; latches for the same; pinions movable into and out of engagement with said racks; means for varying the periods of engagement and disengagement between racks and pinions including separately depressible keys and a lever engaged thereby; a lock on said lever normally engaging both said keys but movable to release the same and further movable to engage them; means for causing one or more of the pinions to count the collective turnings of the others; type-carriers connected with the racks; impression devices coöperatively related in sections corresponding with the latch sections and the section of counting pinions; an arm swung by the aforesaid lever; a lever having a member for disabling the impression devices of the middle section; a link connected to said last-mentioned lever; a thrust-bar connected to said link; and a cam-bar engaging said thrust-bar and controlling the counting means and the key lock.

55. In a machine of the character described, the combination of racks; latches for the same; pinions movable into and out of engagement with said racks; means for varying the periods of engagement and disengagement between racks and pinions including separately depressible keys; means operated by said keys for disengaging different sections of latches from the racks; means for causing one or more of the pinions to count the number of collective forward turnings of the others; type-carriers connected with the racks; hammers; latches for the latter coöperatively related in sections to correspond with the sections of racks latches and the division in the pinions for counting; couplings between the sections of latches; a shaft having projections to displace the couplings; a gear on said shaft; a gear segment in mesh with said gear; an arm swung by the keys; a lever having a bar to displace the hammer latches of the middle section; a movable bar to intercept the count hammers; a slide-piece on said lever adapted to engage said movable bar; a link pivoted to the lever and adapted to be moved into line with the aforesaid arm and to act upon said slide-piece; a thrust-bar connected to said link and to the aforesaid gear segment; and a cam-slide to act upon said thrust-bar, said slide controlling the counting means.

56. In a machine of the character described, the combination of racks and pinions normally engaged during movement of the racks in one direction and disengaged during movement of the racks in the reverse direction; means for reversing this order of engagement and disengagement, said means including separately depressible keys; rack-releasing means appropriated to different sections of racks and independently operated by said keys; and means for keeping the racks and pinions engaged during movement of the racks in both directions, including separately depressible keys operating independently upon different sections of said rack-releasing means.

57. In a machine of the character described, the combination of reciprocating racks; a rocking frame; adding pinions journaled therein; a pitman to rock said frame engageable therewith alternately on opposite sides of its rocking center; a link through which to shift said pitman; a lever having a slot-and-pin connection with said link; two key levers separately engaged with said link-lever; latches normally engaging the racks; two bails for withdrawing the latches in separate sections; two pairs of arms for operating the bails respectively, said pairs of arms swung independently by the said key levers; two additional key levers; and two bars coupled thereto respectively and separately engaged with the first-mentioned key-levers respectively and having raised portions to limit the movement of the aforesaid link; substantially as and for the purpose described.

58. In a machine of the character described, the combination of an accumulator, actuators therefor; total-taking means; independently operable keys for setting the total-taking means; a lock for said keys moved to effective position by the setting of the total-taking means; and a prime mover adapted to engage said lock.

59. In a machine of the character described, the combination of an accumulator, actuators therefor; total-taking means; independently operable keys for setting the total-taking means; a lock moved to effective position by the setting of said total-taking means and engaging the operated key to hold it against recovery and the unoperated key to prevent it from being operated; and a prime mover adapted to engage said lock.

60. In a machine of the character described, the combination of an accumulator, actuators therefor; total-taking means; independently operable key levers for setting said total-taking means, said levers having lateral projections; a locking arm having a beak to engage said projections, said arm operated by the setting of the totaling means; and a prime mover for holding said arm in operated position.

61. In a machine of the character described, the combination of an accumulator, actuators therefor; total-taking means; independently operable key levers for setting said total-taking means, said levers having lateral projections; a locking arm having a beak to engage said projections extending toward each other; a pivoted locking arm having a broadened beak to engage both said projections simultaneously, said arm operated by the setting of the totaling means; and a prime mover for holding the arm in operated position.

62. In a machine of the character described, the combination of an accumulator, actuators therefor; total-taking means including a lever; key-levers separately engaging the latter and having lateral projections; an arm linked to said lever and having a beak to engage said lateral projections; and a prime mover adapted to hold said arm operated.

WILLIAM J. KILPATRICK.

Witnesses:
J. G. VINCENT,
ARTHUR W. FRENZEL.